(12) United States Patent
Waye et al.

(10) Patent No.: US 9,046,103 B2
(45) Date of Patent: Jun. 2, 2015

(54) VACUUM PUMP

(75) Inventors: Andrew Waye, Forest Row (GB); Mark Spitteler, Horley (GB)

(73) Assignee: Edwards Limited, Crawley (GB)

( * ) Notice: Subject to any disclaimer, the term of this patent is extended or adjusted under 35 U.S.C. 154(b) by 1552 days.

(21) Appl. No.: 12/663,475

(22) PCT Filed: Jun. 30, 2008

(86) PCT No.: PCT/GB2008/050524
§ 371 (c)(1),
(2), (4) Date: Jul. 28, 2010

(87) PCT Pub. No.: WO2009/004378
PCT Pub. Date: Jan. 8, 2009

(65) Prior Publication Data
US 2010/0296917 A1    Nov. 25, 2010

(30) Foreign Application Priority Data

Jul. 2, 2007 (GB) .................................. 0712777.2

(51) Int. Cl.
| | |
|---|---|
| *F04D 29/08* | (2006.01) |
| *F04D 19/04* | (2006.01) |
| *F04C 25/02* | (2006.01) |
| *F04C 29/02* | (2006.01) |
| *F04D 29/059* | (2006.01) |
| *F04D 29/063* | (2006.01) |
| *F16C 33/66* | (2006.01) |
| *F16N 7/12* | (2006.01) |
| *F16N 7/36* | (2006.01) |

(52) U.S. Cl.
CPC .............. *F04D 19/042* (2013.01); *F04C 25/02* (2013.01); *F04C 29/02* (2013.01); *F04C 2240/50* (2013.01); *F04D 29/059* (2013.01); *F04D 29/063* (2013.01); *F16C 33/6648* (2013.01); *F16C 33/6659* (2013.01); *F16N 7/12* (2013.01); *F16N 7/366* (2013.01)

(58) Field of Classification Search
CPC ........ F04C 25/02; F04C 29/02; F04D 29/053; F04D 29/063; F16C 33/6648; F16C 33/6659; F16N 7/12; F16N 7/366
USPC .......... 384/462, 465, 469, 471, 473; 415/110, 415/111, 229; 416/174; 417/423.4
See application file for complete search history.

(56) References Cited

U.S. PATENT DOCUMENTS

| | | | | |
|---|---|---|---|---|
| 1,457,384 | A * | 6/1923 | Miller ............................ | 384/176 |
| 2,878,048 | A * | 3/1959 | Peterson ....................... | 277/355 |
| 3,040,702 | A * | 6/1962 | Eng et al. ..................... | 118/718 |

(Continued)

FOREIGN PATENT DOCUMENTS

| | | |
|---|---|---|
| EP | 0232978 A2 | 8/1987 |
| EP | 1267081 A2 | 12/2002 |

(Continued)

*Primary Examiner* — Nathaniel Wiehe
*Assistant Examiner* — Woody A Lee, Jr.
(74) *Attorney, Agent, or Firm* — Shumaker & Sieffert, P.A.

(57) ABSTRACT

A vacuum pump (50) comprises a casing and a rotor located in the casing, the rotor comprising a shaft (52) supported by a bearing arrangement (64, 66) for rotation relative to the casing. A lubricant reservoir (82) is provided for storing lubricant for lubricating a rolling bearing (64) of the bearing arrangement, and a brush (84) comprising a set of bristles (86) held by the reservoir transfers lubricant from the reservoir to the rotor.

20 Claims, 3 Drawing Sheets

(56) References Cited

U.S. PATENT DOCUMENTS

| | | | | |
|---|---|---|---|---|
| 4,498,433 | A | * | 2/1985 | Ogawa ........................ 123/90.38 |
| 5,499,902 | A | * | 3/1996 | Rockwood .................... 415/113 |
| 6,098,755 | A | * | 8/2000 | Wyssmann ..................... 184/22 |
| 8,186,937 | B2 | * | 5/2012 | Brewster et al. ................ 415/90 |
| 8,256,575 | B2 | * | 9/2012 | Berberich .................... 184/6.11 |

FOREIGN PATENT DOCUMENTS

| | | |
|---|---|---|
| GB | 628279 A | 7/1946 |
| GB | 1412124 A | 2/1972 |
| GB | 2121478 A | 3/1983 |
| WO | 93/11381 A | 6/1993 |
| WO | 2006/111695 A | 10/2006 |

* cited by examiner

VACUUM PUMP

FIELD OF THE INVENTION

This invention relates to a vacuum pump, and in particular to the lubrication of rolling bearings used to support the impeller of a vacuum pump.

BACKGROUND OF THE INVENTION

Vacuum pumps typically comprise an impeller in the form of a rotor mounted on a shaft for rotation relative to a surrounding stator. The shaft is supported by a bearing arrangement comprising two bearings located at or intermediate respective ends of the shaft. One or both of these bearings may be in the form of rolling bearings. Usually, the upper bearing is in the form of a magnetic bearing, and the lower bearing is in the form of a rolling bearing.

A typical rolling bearing comprises an inner race fixed relative to the shaft, an outer race, and, located between the races, a plurality of rolling elements for allowing relative rotation of the inner race and the outer race. To prevent mutual contacts between the rolling elements, they are often guided and evenly spaced by a cage. Adequate lubrication is essential to ensure accurate and reliable operations of rolling bearings. The main purpose of the lubricant is to establish a load-carrying film separating the bearing components in rolling and sliding contact in order to minimise friction and wear. Other purposes include the prevention of oxidation or corrosion of the bearing components, the formation of a barrier to contaminants, and the transfer of heat away from the bearing components. The lubricant is generally in the form of either oil or grease (a mixture of oil and a thickening agent).

Vacuum pumps using oil-lubricated bearings require an oil feeding system for feeding oil between the contact areas of the bearing, which enables the oil to perform cooling as well as lubrication and thereby permit the bearings to run at a faster speed. Turbo-molecular pumps have traditionally used a wicking system for supplying oil to a rolling bearing. In such a system, a felt wick partially submerged in an oil reservoir feeds oil to a conical "oil feed" nut mounted on the shaft. With rotation of the pump, oil travels along the conical surface of the nut to the bearing. The oil passes through the bearing and is returned to the reservoir.

Felt is formed by matting a large number of individual filaments, and so the felt wick is normally treated with a rubber stabilising agent. This is because untreated felt wicks are prone to release debris, usually in the form of individual filaments, parts of filaments, or dirt trapped within the filaments during matting, into the oil. This debris is subsequently carried by the oil into the bearing. The resulting contamination of the bearing can cause damage which promotes premature bearing failure. Whilst washing the wicks can reduce the amount of dirt-related contamination of bearings, the washing process tends to damage the integrity of the felt, leading to increased release of filaments and filament fragments during use.

There are also problems associated with the use of treated fibre wicks. The stabilising agent used to treat the wicks is temperature sensitive. The high relative velocities (typically in excess of 25 ms$^{-1}$) experienced within a turbomolecular vacuum pump cause significant quantities of frictional heat to be generated. With prolonged use, the treated wicks can become deformed and hardened as the tip of the wick begins to char and consolidate. This hardening can significantly reduce the rate at which oil is transferred from the reservoir to the bearing as the consolidation of the felt and the deformation of the tip reduces the ability of the wick to retain good contact with the surface of the nut. This reduction in the rate of transfer of oil causes further charring and deterioration of the felt wick. Consequently, premature bearing failure can occur through wear damage and overheating caused by poor lubrication.

Conventional materials used for manufacturing bearing cages, such as Phenolic resin, tended to absorb some of the oil. This oil retention caused the bearing to be reasonably tolerant to a non-lubricated environment as the cage material was able to act as a further source of lubricant. More recently the cages of bearings are being manufactured from a single piece of material which, whilst being more accurate and better balanced, is more sensitive to wear. In particular the new materials being used, e.g. Torlon®, do not absorb oil in the same manner as the conventional materials, and therefore bearings with cages manufactured from these new materials are much less tolerant of lubrication starvation.

BRIEF SUMMARY OF THE INVENTION

The present invention provides a vacuum pump comprising a housing, a rotor supported by a bearing arrangement for rotation relative to the housing, a lubricant reservoir for storing lubricant for lubricating a rolling bearing of the bearing arrangement, and a brush for transferring lubricant from the reservoir to the rotor, the brush comprising a set of bristles held by the reservoir.

By providing a brush for transferring the lubricant to the rotor, rather than using a conventional felt pad, a lubricating device having enhanced wear properties is provided. In use, the bristles (which term includes bristles, fibres and filaments) of is the brush retain their configuration so that delivery of lubricant is maintained over time. This can enable consistent lubrication of the bearing and enable materials that are sensitive to lubrication starvation to be used in the manufacture of a cage for the bearing.

The bristles may be arranged substantially orthogonal to the axis of rotation of the rotor or they may be inclined towards the rolling bearing. The brush may have an end contacting the rotor which is angled relative to a plane normal to the length of the bristles. The bristles may be retained within an aperture formed in the reservoir.

The lubricant reservoir may extend about the rotor. A second brush for transferring lubricant from the reservoir to the rotor may be provided, the second brush comprising a set of bristles held by the reservoir. The brushes may be angularly spaced about the rotor. The brushes may be substantially diametrically opposed. The brushes may contact the rotor at locations which are staggered along the rotor.

The reservoir may be formed from a bi-component material for example a material comprising polypropylene and polyethylene. The bristles may be natural or synthetic.

BRIEF DESCRIPTION OF SEVERAL VIEWS OF THE DRAWING

Preferred features of the present invention will now be described, by way of example only, with reference to the accompanying drawings, in which.

DETAILED DESCRIPTION OF THE INVENTION

Figure 1:
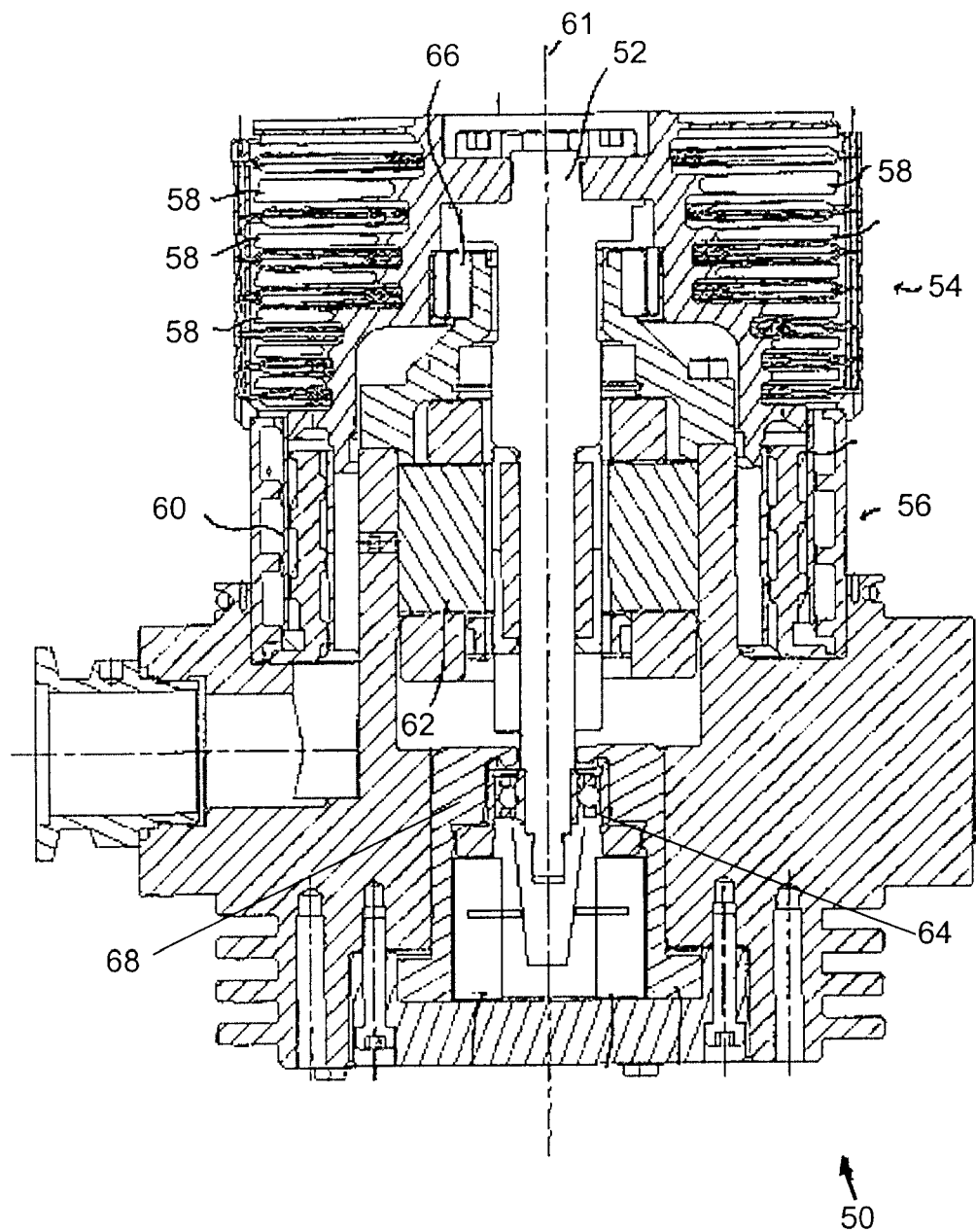
FIG. 1 illustrates a cross-sectional view through a turbomolecular vacuum pump.

FIG. 1 shows a cross-section of a vacuum pump 50 comprising a pumping arrangement driven by a shaft 52. The illustrated vacuum pump is a turbomolecular vacuum pump comprising a turbomolecular pumping mechanism 54 and a molecular drag pumping mechanism 56. The turbomolecular pumping mechanism comprises a plurality of rotor blades 58 mounted on, or integral with, the shaft 52. The molecular drag pumping mechanism 56 is in the form of a Holweck pumping mechanism, and comprises one more cylinders 60 mounted on the shaft 52. The shaft is rotated about longitudinal axis 61 by a motor 62 to drive the pumping arrangement.

The shaft 52 is supported by a bearing arrangement comprising two bearings which may be positioned either at respective ends of the shaft as shown or alternatively intermediate the ends. In FIG. 1, a rolling bearing 64 supports a first portion of the shaft 52 and a magnetic bearing 66 supports a second portion of the shaft 52. A second rolling bearing may be used as an alternative to the magnetic bearing 66. When a magnetic bearing is used, it may also be desirable to incorporate a back-up bearing.

Figure 2:
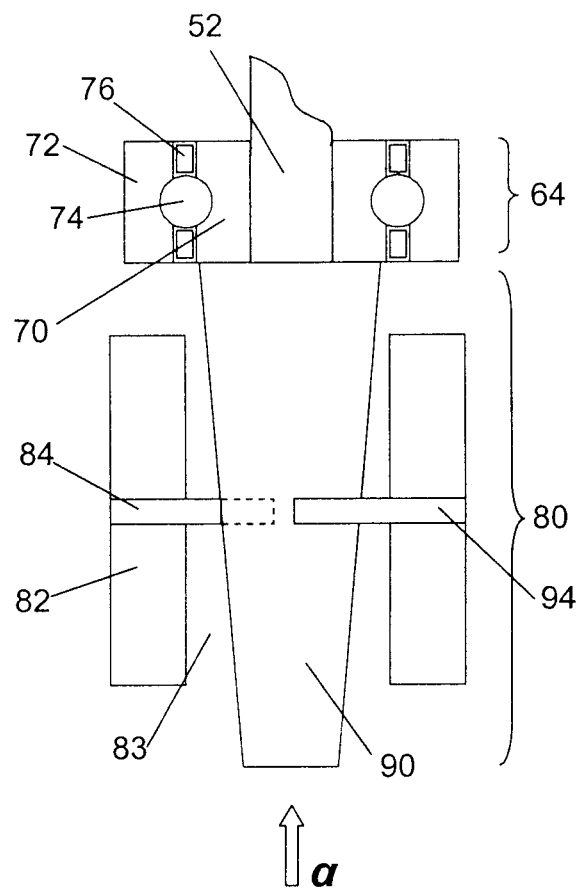
FIG. 2 illustrates a first embodiment of a system for supplying lubricant to the rolling bearing of the pump of FIG. 1.

The rolling bearing 64 is provided between the second end portion of the shaft 52 and a housing portion 68 of the pump 50. With reference also to FIG. 2, the rolling bearing 64 comprises an inner race 70 fixed relative to the shaft 52, an outer race 72, and a plurality of rolling elements 74, supported by a cage 76, for allowing relative rotation of the inner race 70 and the outer race 72.

Figure 3:
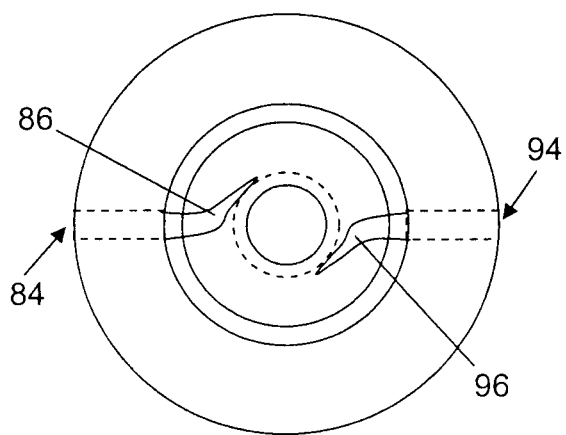
FIG. 3 illustrates an end view of the lubricant supply system of FIG. 2 (in the direction α)

The rolling bearing 64 is lubricated by a lubricant supply system 80 to establish a load-carrying film separating the bearing components in rolling and sliding contact in order to minimise friction and wear. The lubricant supply system 80 comprises a liquid lubricant reservoir 82, which surrounds an axis of rotation 61 of the shaft 52. The reservoir 82 is provided by a stable fibrous annular substrate surrounding a central bore 83 of the reservoir 82, and having voids within which oil, or other liquid lubricant, is stored. The reservoir 82 holds a brush 84 comprising a set of filaments or bristles 86. The brush 84 is oriented such that the bristles lie orthogonal to the longitudinal axis of the bore 83 of the reservoir 82, which is also the rotational axis 61 of the shaft 52. A portion of the length of the bristles 86 is embedded within the substrate of the reservoir 82 and the remaining portion of the bristles 86 protrude into the bore 83 of the reservoir 82. As illustrated in FIG. 3, a second brush 94 having a set of bristles 96 may be provided at a location approximately diametrically opposite the brush 84.

The brushes 84, 94 are held by the reservoir 82 so that the bristles 86, 96 are in contact with a tapered feed nut 90 mounted on the shaft 52 and located within the bore 83 of the reservoir 82. The end of the tapered nut 90 located adjacent the bearing 64 has an external diameter which is approximately equal to the internal diameter of the cage 76 of the bearing 64. In this embodiment, the brushes 84,94 are located approximately midway along the axial length of the reservoir 82. However, this location is arbitrary and the axial location of the brushes 84, 94 may vary from one vacuum pump to another. The axial location of the brushes 84, 94 is selected to balance the benefits of maximising the volume of oil that can be accessed from the reservoir 82 whilst minimising the distance over which oil is transferred along the feed nut 90 to the bearing 64. In this example two brushes are shown at a single axial location but further brushes may be provided at a to different axial location. The location of the brushes 84, 94 may be staggered along the length of the reservoir 82. Furthermore, one or more additional brushes may be held within the reservoir 82 at the same axial location as those illustrated in this example to give three or more brushes at a single axial location.

Oil, or other liquid lubricant, is retained within the reservoir 82 such that the part of the bristles 86, 96 that is embedded within the reservoir 82 comes into contact with the lubricant. In use, the lubricant is drawn along the extent of the bristles 86, 96 to the protruding part by capillary action and is deposited onto the feed nut 90 as it rotates. This oil is transferred axially along the feed nut 90 to the cage 76 of the bearing 64 by virtue of the taper on the nut 90 and the rotation of the nut.

Figure 4:
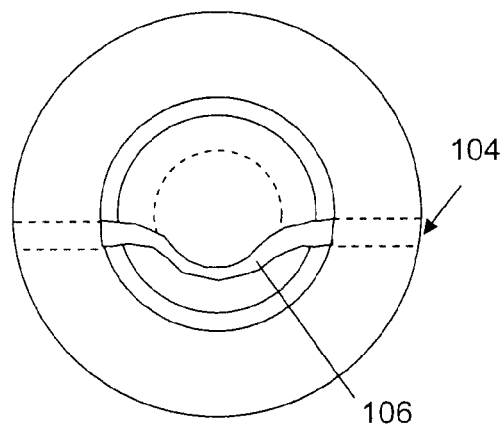
FIG. 4 illustrates a second embodiment of a system for supplying lubricant to the rolling bearing of the pump of FIG. 1.

A second embodiment of a lubricant supply system is illustrated in FIG. 4, in which a brush 104 comprises a set of bristles 106 which extend across the bore 83 of the reservoir 82 to be held by the reservoir at diametrically opposite locations. Such a configuration further increases the contact that can be achieved between the bristles 106 and the feed nut 90 and enhances the reliability of the delivery of oil thereto.

Figure 5:
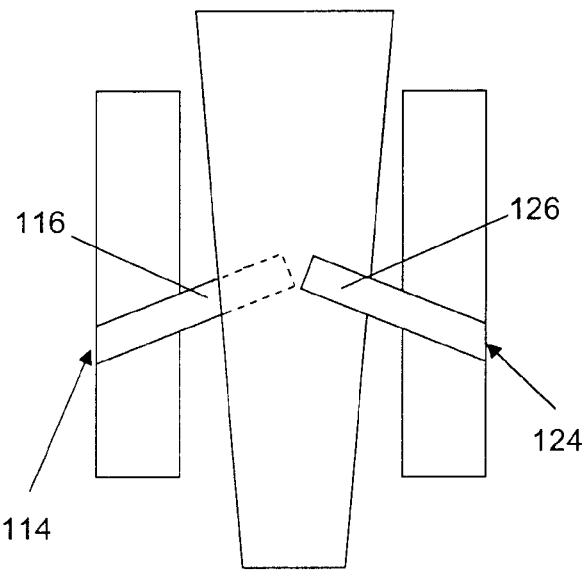
FIG. 5 illustrates a third embodiment of a system for supplying lubricant to the rolling bearing of the pump of FIG. 1.

FIG. 5 illustrates a third embodiment of a lubricant supply system, in which the bristles 116, 128 of each brush 114, 124 are inclined at an angle to the axis 61 of the bore of the reservoir 82 so that the bristles 116, 126 experience a smaller amount of deformation when contacting the feed nut 90.

Figure 6:
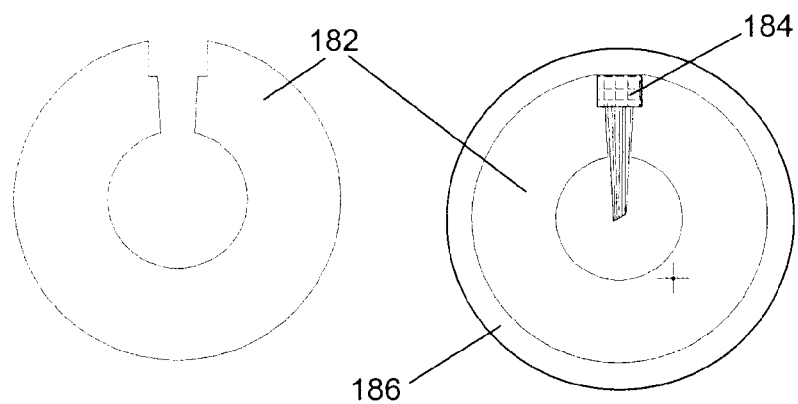
FIG. 6 illustrates a method of assembling any of the aforementioned lubricant supply systems.

In any of the above embodiments, the bristles 86, 96 are gathered together at one end and held by crimping or adhesive to form brushes 84, 94. Each brush is then threaded through the reservoir from the external surface thereof and the crimp is held in a recess located at the outer periphery of the reservoir 82. Each brush 84, 94 may be inserted into an aperture that is preformed in the reservoir material or it may be driven through the material without first forming such an aperture. An alternative method of fixing the brushes in place is illustrated in FIG. 6 and involves using a C-shaped cross section of reservoir material 182 and placing the brush 184 between the opposing ends. The brush is then clamped in place by pressing the reservoir into a sleeve 186 or bore having a smaller internal diameter than the outer diameter of the reservoir material 182.

The reservoir material is preferably a bi- or multi-component material made from, for example, polypropylene and polyethylene, such as "BNW Sheet". This material is particularly suitable as it is sufficiently rigid be shaped and to accurately locate and support the brush 84 therein, whilst having good oil wicking properties to readily allow the transfer of oil from the material to the brush. The material does not shed fibrous or particulate matter during use. Alternatively a soft felt material could be used as the reservoir material, but an outer sleeve or collar would be required to retain the brush in the correct location.

The brushes 84, 94 may be made from natural bristles such as sable hair, squirrel hair, goat hair or ox hair, or from a synthetic material such as polyester, nylon or Kanegoat®. The natural bristles have a very small diameter (20-40 microns) and perform better than synthetic bristles having larger diameters (100-200 microns).

Brushes 84, 94 provide an improved lubricant applicator when compared to conventional felt pads as the individual filaments do not fuse together. Consequently, the lubricant applicator does not degenerate like a conventional felt pad. Contamination of the bearing through degeneration of the lubricant applicator is therefore inhibited. In addition, the rate of oil transfer to the bearing from the reservoir is more consistent and reliable over time when using a brush applicator.

A further advantage associated with the use of a brush applicator is that the resilience or bias of the applicator is improved when compared to a conventional felt pad. Therefore better contact with the feed nut is maintained during use of the pump, and the rate of transfer of oil from the reservoir to the feed nut is improved.

We claim:

1. A vacuum pump comprising:
   a housing;
   a bearing arrangement;
   a rotor supported by the bearing arrangement for rotation relative to the housing;
   a lubricant reservoir that extends about an axis of rotation of the rotor, wherein the lubricant reservoir stores lubricant for lubricating a rolling bearing of the bearing arrangement, and wherein the lubricant reservoir comprises a fibrous annular substrate having voids within which the lubricant is stored; and
   a brush for transferring lubricant from the lubricant reservoir to the rotor, the brush comprising a set of bristles held by the lubricant reservoir, wherein bristles of the set of bristles extend into at least some of the voids, and wherein bristles of the set of bristles held by the lubricant reservoir come into contact with lubricant within the lubricant reservoir.

2. The vacuum pump of claim 1, wherein the brush is arranged substantially orthogonal to the axis of rotation of the rotor.

3. The vacuum pump of claim 1, wherein the brush is inclined towards the rolling bearing.

4. The vacuum pump of claim 1, wherein the brush is retained within an aperture formed in the lubricant reservoir.

5. The vacuum pump of claim 1, wherein the brush comprises a plurality of brushes for transferring lubricant from the lubricant reservoir to the rotor, each of the plurality of brushes comprising sets of bristles held by the lubricant reservoir.

6. The vacuum pump of claim 5, wherein respective brushes of the plurality of brushes are angularly spaced about the rotor.

7. The vacuum pump of claim 6, wherein the plurality of brushes comprises a first brush and a second brush, and wherein the first and second brushes are substantially diametrically opposed.

8. The vacuum pump of claim 5, wherein respective brushes of the plurality of brushes contact the rotor at locations which are staggered along a length of the rotor.

9. The vacuum pump of claim 1, wherein the lubricant reservoir is formed from a multi-component material.

10. The vacuum pump of claim 9, wherein the multi-component material comprises polypropylene and polyethylene.

11. The vacuum pump of claim 1, wherein the brush comprises a natural material.

12. The vacuum pump of claim 1, wherein the brush comprises a synthetic material.

13. The vacuum pump of claim 1, in the form of a turbomolecular vacuum pump.

14. The vacuum pump of claim 1, wherein the brush is configured to contact a surface of the rotor.

15. A vacuum pump comprising:
    a housing;
    a bearing arrangement;
    a rotor supported by the bearing arrangement for rotation relative to the housing;
    a lubricant reservoir that extends about an axis of rotation of the rotor, wherein the lubricant reservoir stores lubricant for lubricating a rolling bearing of the bearing arrangement, wherein the lubricant reservoir defines a bore, and wherein the rotor is at least partially disposed in the bore;
    a brush for transferring lubricant from the lubricant reservoir to the rotor, the brush comprising a set of bristles held by the lubricant reservoir, wherein bristles of the set of bristles held by the lubricant reservoir come into contact with lubricant within the lubricant reservoir, wherein the set of bristles extend across the bore, and wherein a first end of the set of bristles is held by the lubricant reservoir at a first location of the lubricant reservoir and a second end of the set of bristles is held by the lubricant reservoir at a second location of the lubricant reservoir.

16. The vacuum pump of claim 15, wherein the first location is substantially diametrically opposite to the second location.

17. The vacuum pump of claim 15, wherein the brush is arranged substantially orthogonal to the axis of rotation of the rotor.

18. The vacuum pump of claim 15, wherein the brush comprises a plurality of brushes for transferring lubricant from the lubricant reservoir to the rotor, each of the plurality of brushes comprising sets of bristles held by the lubricant reservoir.

19. The vacuum pump of claim 18, wherein respective brushes of the plurality of brushes contact the rotor at locations which are staggered along a length of the rotor.

20. The vacuum pump of claim 15, wherein the lubricant reservoir comprises a multi-component material, and wherein the multi-component material comprises polypropylene and polyethylene.

* * * * *